US007183476B2

(12) United States Patent
Swingle et al.

(10) Patent No.: US 7,183,476 B2
(45) Date of Patent: Feb. 27, 2007

(54) PORTABLE ELECTRONIC MUSIC SCORE DEVICE FOR TRANSPORTING, STORING DISPLAYING, AND ANNOTATING MUSIC SCORES

(76) Inventors: Margaret J. Swingle, 5680 Tolo Rd., Bainbridge Island, WA (US) 98110; Susan E. Klein, 14335 Sunrise Dr., NE., Bainbridge Island, WA (US) 98110

( * ) Notice: Subject to any disclaimer, the term of this patent is extended or adjusted under 35 U.S.C. 154(b) by 0 days.

(21) Appl. No.: 11/084,084

(22) Filed: Mar. 17, 2005

(65) Prior Publication Data

US 2005/0204889 A1 Sep. 22, 2005

(51) Int. Cl.
*G09B 15/00* (2006.01)
*G09B 15/02* (2006.01)

(52) U.S. Cl. .................................................... 84/477 R

(58) Field of Classification Search ............. 84/470 R, 84/471 R, 477, 478
See application file for complete search history.

(56) References Cited

U.S. PATENT DOCUMENTS 5,400,687 A * 3/1995 Ishii ......................... 84/477 R
5,665,927 A * 9/1997 Taki et al. ..................... 84/609
5,760,323 A * 6/1998 Romero et al. ........... 84/470 R
5,792,972 A * 8/1998 Houston ....................... 84/645
6,051,769 A * 4/2000 Brown, Jr. ................ 84/477 R
6,348,648 B1 * 2/2002 Connick, Jr. .............. 84/477 R
6,483,019 B1 * 11/2002 Hamilton .................. 84/477 R
2002/0113784 A1 * 8/2002 Feilmeier et al. ........... 345/419
2004/0040433 A1 * 3/2004 Errico ....................... 84/477 R
2004/0159212 A1 * 8/2004 Terada ...................... 84/477 R
2004/0218451 A1 * 11/2004 Said et al. .................. 365/222

* cited by examiner

*Primary Examiner*—Jeffrey W Donels
(74) *Attorney, Agent, or Firm*—Black Lowe & Graham PLLC

(57) ABSTRACT

A portable electronic device integrating compact storage for a large collection of musical scores, rapid access to any score in the collection, a display adjustable for various viewing conditions and individual needs, support for annotation that preserves the original score, and simplified page turning. The device includes two touch-sensitive displays hinged together so as to approximate the familiar form of a musical score. The device opens to display two pages of music, one on each of the touch-sensitive displays. The device may be placed on a music stand or piano ledge in the same manner as a traditional musical score. Removable mass storage medium allows virtually unlimited expansion of a score collection. Menu selection and subsequent random access to selected scores result in rapid retrieval of any score a musician may require. The touch-sensitive surface of the touch-sensitive displays allows menu selection, display adjustment, page-turning, and other features at the touch of a finger, as well as non-destructive annotation at the stroke of a stylus. In sum, the device enhances the interaction between musician and musical score in ways that transform the manner of a musician's ownership and use of a large collection of scores.

23 Claims, 3 Drawing Sheets

PORTABLE ELECTRONIC MUSIC SCORE DEVICE FOR TRANSPORTING, STORING DISPLAYING, AND ANNOTATING MUSIC SCORES

BACKGROUND OF THE INVENTION

1. Field of the Invention

The present invention relates to a portable electronic music score device. More particularly, the present invention relates to a portable electronic music score device for transporting, storing, displaying, and annotating music scores.

2. Description of the Prior Art

Conventionally, sheet music is widely used. The conventional storage and handling of written music has long presented a problem for the professional and amateur musician alike. Among these problems are the difficulty of storing the large volume of material, accessing individual works or sections of works, displaying the music in a clearly visible way under differing lighting and other conditions, transporting the music with ease, page-turning without disruption, annotating the music efficiently, and doing all this without damaging the musical score.

Sheet music is typically published as single works or in compilations of works of a single composer or composers of a particular period or any number of other thematic bases for compilations. Many of these volumes are tens or even hundreds of pages and are cumbersome to transport, file, and access. Whether purchased as single works or in large volumes, the physical space required for storage is considerable and the difficulty of accessing the music you want at any given time becomes increasingly difficult as more sheet music is acquired.

Music is played in different lighting conditions, ranging from the dimmed lighting in an orchestra pit to the bright lighting in a home with large windows and skylights. Those who play music also have different visual acuity. These varying conditions create a need to be able to adjust the contrast between the musical notations and the page, as well as to be able to adjust the size of the notes.

Performing musicians, students, teachers, and others transport their music to lessons, rehearsals, performances, and the like. Carrying large volumes or multiple sheets is cumbersome, inconvenient, and often just plain heavy. Over time it also damages the sheet music. An easier means of taking the music with you is needed.

Page-turning has long interfered with practice and performance, requiring an individual to interrupt playing to turn the page or have someone else available to do the page-turning. Music is not meant to be broken by page-turning and a better means of being able to play continuously is needed. In addition, the conventional system of page-turning contributes significantly to damage to sheet music.

Teachers, students, and performers often annotate their music, marking dynamics, fingering, comments, highlighting elements, and so on. At a later date many of these are erased or changed. The page can become messy and damaged. A cleaner, more efficient means of annotating is needed.

All the above problems require improvements in the conventional system of displaying and handling musical scores.

Numerous innovations for display devices have been provided in the prior art. Even though these innovations may be suitable for the specific individual purposes to which they are addressed, they each differ in structure and/or operation and/or purpose from the present invention.

FOR EXAMPLE, U.S. Pat. No. 4,350,070 to Bahu teaches an electronic music book for simplifying the storage and retrieval of musical scores in which a control panel operates electronic memories to locate a song in the memory for a musician's reading thereof. Optional modules may be added to the memory to expand the library of songs stored by the book. A variety of additional features may be included in the music book, such as audio playback of a selected song, tempo and rhythm control, and a temporary memory for musical works entered through a musical keyboard in the control panel. The book is adapted to be attached to a music stand and may be battery operated for portable use or permanently connected to a source of A.C. voltage.

ANOTHER EXAMPLE, U.S. Pat. No. 4,366,741 to Titus teaches an electronic piano that has a keyboard and an electronic piano circuit connected to a micro-processor used to control a CRT device to provide a video note display concurrently with the depression of one or more keys. A keyboard representation located adjacent the screen of the CRT device is associated with lights used to indicate the key or keys that are played. Manually operated controls cooperate with the micro-processor to allow the back clearing of the screen one note at a time, to remove all the notes, to retain all the notes, to indicate sharp or flat mode of each note, and to indicate the duration that a key is depressed by elongating the note on the screen. A metronome unit is used with the micro-processor to provide a visual beat marker on the screen that sequentially moves across the screen. A movable frame connects the CRT device to the piano.

STILL ANOTHER EXAMPLE, U.S. Pat. No. 4,779,510 to Van den Abbeel teaches an apparatus comprising a console having a screen for displaying a music score recorded on a score support. In addition to information representing the music score, the score support has position indicators at predetermined locations along the support. Each position indicator corresponds to a reference signature in the score. The console includes means for reading and displaying the score information carried by the support, driving means responsive to a control signal to move forward the score support thereby to display successive portions of the score on the screen, electronic control means adapted to monitor the performance of a piece of music and recognize therein the predetermined reference signature, and produce a page change command signal for moving forward the score support each time a reference signature is recognized in the musical performance such that successive portions of the score are displayed on the screen, and a keyboard for use by an operator.

YET ANOTHER EXAMPLE, U.S. Pat. No. 4,976,182 to Obuchi et al. teaches a musical score display device for a music score processor that is formed into a rectangular plate-like form so as to be detachably mounted on the processor. The device includes a cable for connecting the display device with the processor. The musical score display device may include an LCD provided with two touch sensors. By pressing the sensors, the next page or previous page of music score is displayed.

STILL YET EXAMPLE, U.S. Pat. No. 5,049,862 to Dao et al. teaches a keyboardless portable computer that simulates a foldable notepad and has a display which can be reoriented to the convenience of the user, carried in a self-protecting closed position, and operated in any convenient open position. The computer has a first flat panel, a second flat panel, and hinge means for joining the first panel to the second panel such that the first flat surface is juxtaposed to the second flat surface in a closed position and is disposed side by side in a common plane in one of a selection of open positions. The first flat surface includes a first digitizer and the second flat surface includes a second digitizer, and a stylus is provided which is connectable to at least one of the panels for interacting with at least one of the digitizers. One of the digitizers includes a flat panel display through which visual output is provided. Thus, registration of a written symbol on the surface of the panel produces a displayed symbol, preferably at the position of registration. The panels may be detachable at the hinge means, folded back to back to one another for compact usage, and a second hinge on a digitizer panel permits a bound paper notebook to be interleaved with a thin digitizer.

YET STILL EXAMPLE, U.S. Pat. No. 5,400,687 to Ishii teaches a musical score that can be displayed by a simple operation, thus permitting the musical score to be easily seen when playing the music. Namely, musical score data of a plurality of pieces of music are stored in a musical score display, and when a piece of music is selected, the musical score data of this piece of music is read out and displayed, and thus the musical score data can be easily selected and displayed. The musical score data that has been read out and displayed can be changed according to a feeding of a page. The displayed musical score and the musical score page feed can be easily effected while playing the music. As a result, the displayed musical score is changed according to a progress of a musical repeat, for example Da Capo, Dal Segno, Al Fine, bis, etc.

STILL YET EXAMPLE, U.S. Pat. No. 6,166,314 to Weinstock et al. teaches a computerized method for correlating a performance, in real time, to a score of music, and a machine based on that method. A score processor accepts a score which a user would like to play and converts it into a useable format. Performance input data is accepted by the input processor, and the performance input data is correlated to the score on a note-by-note basis. An apparatus for performing this method includes an input processor that receives input and compares it to the expected score to determine whether an entire chord has been matched, and an output processor which receives a note match signal from the input processor and provides an output stream responsive to the match signals.

YET STILL EXAMPLE, U.S. Pat. No. 6,218,602 to Davis et al. teaches an adaptor module that includes a graphical user interface having a video display and a touch responsive overlay. The graphical user interface displays graphical images representing parameters of an electronic musical instrument and generates control signals. A computer system is also included in the adaptor module for driving the graphical user interface. A music stand for supporting sheet material, wherein the graphical user interface forms part of the music stand. The graphical user interface can be mounted in an opening in the music stand and can provide a touch screen that is flush with the music support surface or recessed. The computer system is adapted for receiving signals from the electronic musical instrument.

In sum, it is apparent that numerous innovations for display devices have been provided in the prior art that are adapted to be used. Even though these innovations may be suitable for the specific individual purposes which they address, they would not be suitable for the purposes of the present invention as heretofore described.

BRIEF SUMMARY OF THE INVENTION

ACCORDINGLY, AN OBJECT of the present invention is to provide a portable electronic music score device for transporting, storing, displaying, and annotating music scores that avoids the disadvantages of the prior art.

ANOTHER OBJECT of the present invention is to provide a portable electronic music score device for transporting, storing, displaying, and annotating music scores in an integrated system that is simple to use.

STILL ANOTHER OBJECT of the present invention is to provide a portable electronic music score device for transporting, storing, displaying, and annotating music scores that allows vast collections of music scores to be stored in a very small space and easily transported, i.e. on a few CDs, DVDs, memory sticks, flash EEPROMs, and the like, etc., rather than in many books (scores) of music.

YET ANOTHER OBJECT of the present invention is to provide a portable electronic music score device for transporting, storing, displaying, and annotating music scores that allows particular music score(s) or musical movement thereof to be instantly accessed and displayed.

STILL YET ANOTHER OBJECT of the present invention is to provide a portable electronic music score device for transporting, storing, displaying, and annotating music scores that allows notes to be displayed in various sizes and allows for at least adjustable contrast, color, and brightness to make for ease of performance in different lighting conditions, such as dimmed or darkened areas, and according to special needs.

YET STILL ANOTHER OBJECT of the present invention is to provide a portable electronic music score device for transporting, storing, displaying, and annotating music scores that simplifies page turning.

STILL YET ANOTHER OBJECT of the present invention is to provide a portable electronic music score device for transporting, storing, displaying, and annotating music scores that facilitates the annotation of musical scores.

YET STILL ANOTHER OBJECT of the present invention is to provide a portable electronic music score device for transporting, storing, displaying, and annotating music scores that is easily portable by folding to music book size.

STILL YET ANOTHER OBJECT of the present invention is to provide a portable electronic music score device for transporting, storing, displaying, and annotating music scores that fits easily on a music stand or piano music ledge.

YET STILL ANOTHER OBJECT of the present invention is to provide a portable electronic music score device for transporting, storing, displaying, and annotating music scores that transforms the way in which people own, access, display, and use a vast library of musical scores.

BRIEFLY STATED, STILL YET ANOTHER OBJECT of the present invention is to provide a portable electronic sheet music device. A processor and an internal memory are contained in a housing and are operatively connected to each other. A touch-sensitive display is disposed on the housing and is operatively connected to the processor. An external memory medium interface is accessible through the housing, is operatively connected to the processor, and operatively connects to an external memory medium. The external memory medium, preferably an optical laser disk, but can include memory sticks, flash EEPROMs, and the like, etc., has encoded thereon music scores and corresponding titles displayable electronically as sheet music on the touch-sensitive display. The housing has left and right halves and the touch-sensitive display has a left half on the left half of the housing and a right half on the right half of the housing.

The left half of the housing is hingedly attached to the right half thereof so as to conceal and protect the touch-sensitive display when the housing is folded closed and not in use.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWINGS

The figures of the drawings are briefly described as follows.

LIST OF REFERENCE NUMERALS UTILIZED IN THE DRAWINGS

Figure 1:
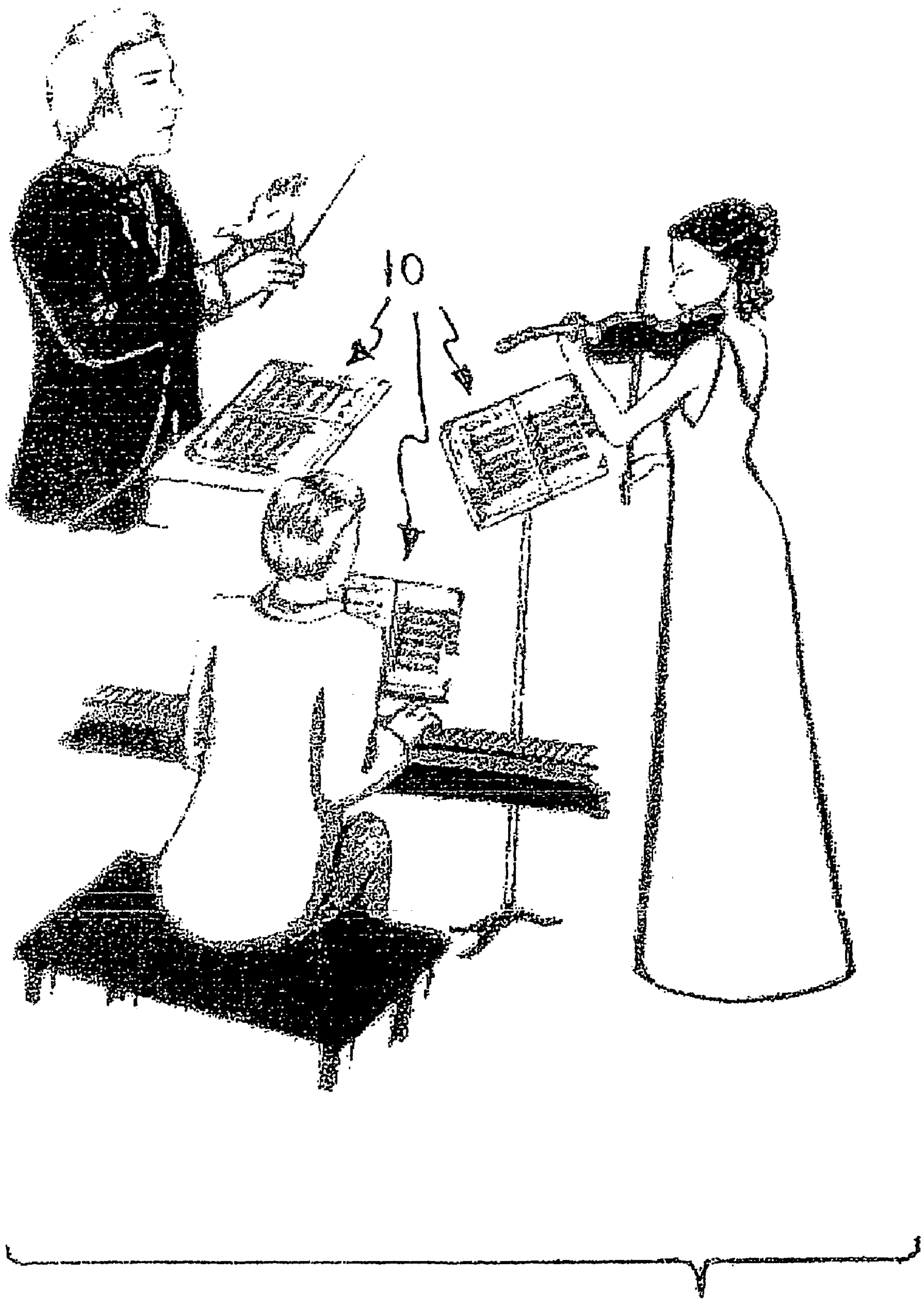
FIG. 1 is a diagrammatic perspective view of a plurality of the portable electronic music score devices for transporting, storing, displaying, and annotating music scores of the present invention in use.

10 portable electronic music score device for transporting, storing, displaying, and annotating music scores of present invention
12 housing
14 processor
16 internal memory
18 touch-sensitive display
20 external memory medium interface
22 external memory medium
23 optical laser disk drive of external memory medium interface 20
24 left half of housing 12
26 right half of housing 12
27 lower left hand corner of left half 28 of touch-sensitive display 18
28 left half of touch-sensitive display 18
29 upper left hand corner of left half 28 of touch-sensitive display 18
30 right half of touch-sensitive display 18
31 lower right hand corner of right half 30 of touch-sensitive display 18
32 top of left half 28 of touch-sensitive display 18
33 upper right hand corner of right half 30 of touch-sensitive display 18
34 touch screen tool bar
36 first touch screen sensor of touch screen tool bar 34
38 second touch screen sensor of touch screen tool bar 34
40 third touch screen sensor of touch screen tool bar 34
42 fourth touch screen sensor of touch screen tool bar 34
44 stylus
46 fifth touch screen sensor of touch screen tool bar 34
47 sixth touch screen sensor of touch screen tool bar 34
48 page turning touch screen sensors
50 pair of first page turning touch screen sensors of page turning touch screen sensors 48
52 pair of second page turning touch screen sensors of page turning touch screen sensors 48
54 on/off switch
55 sound system
56 metronome
58 metronome touch screen sensor controls
60 at least one speaker
62 headphone jack
64 power jack

DETAILED DESCRIPTION OF THE INVENTION

Referring now to the figures, in which like numerals indicate like parts, and particularly to FIG. 1, which is a diagrammatic perspective view of a plurality of the portable electronic music score devices for transporting, storing, displaying, and annotating music scores of the present invention in use, the portable electronic music score device of the present invention is shown generally at 10 for transporting, storing, displaying, and annotating music scores.

Figure 2:
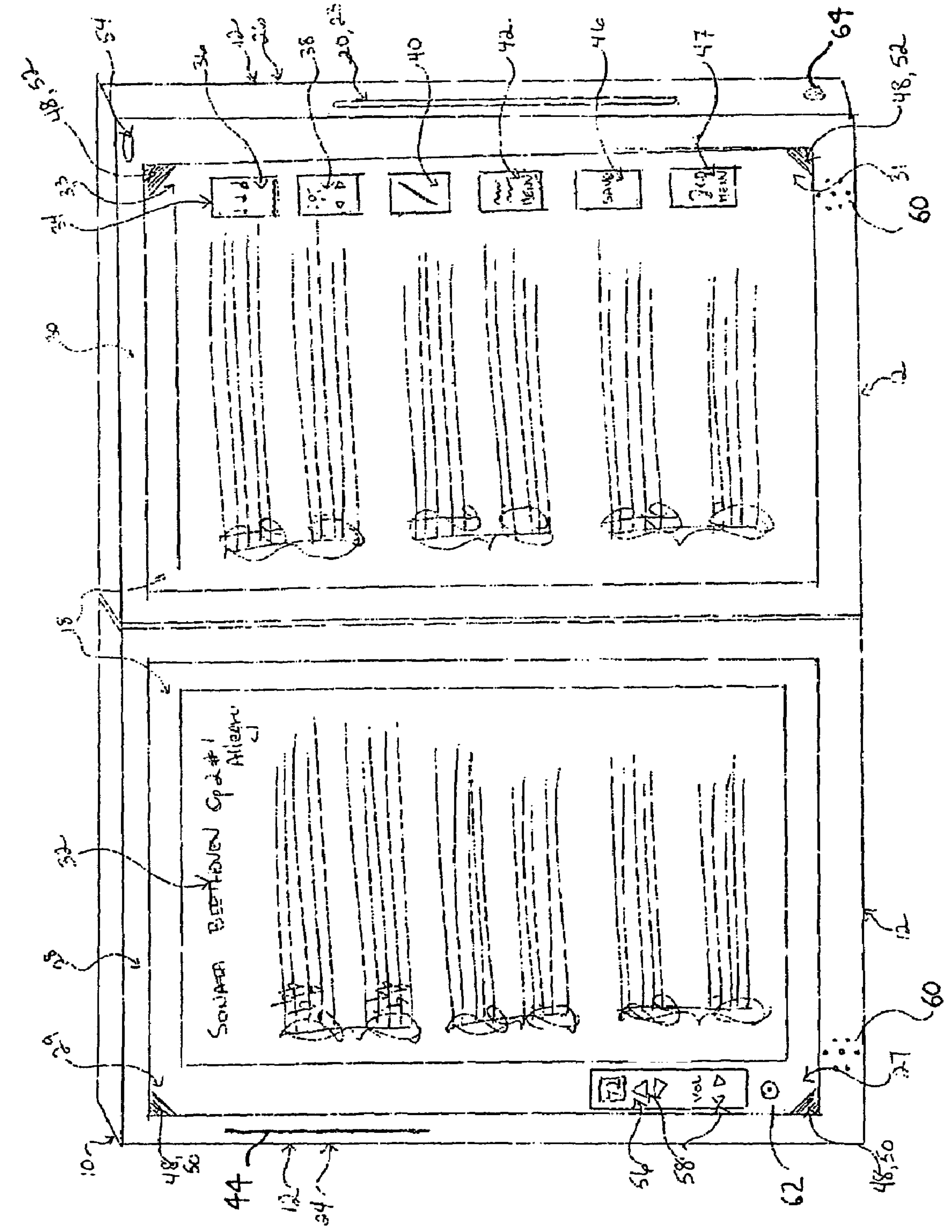
FIG. 2 is an enlarged diagrammatic perspective view of the portable electronic music score device for transporting, storing, displaying, and annotating music scores of the present invention shown in FIG. 1.
Figure 3:
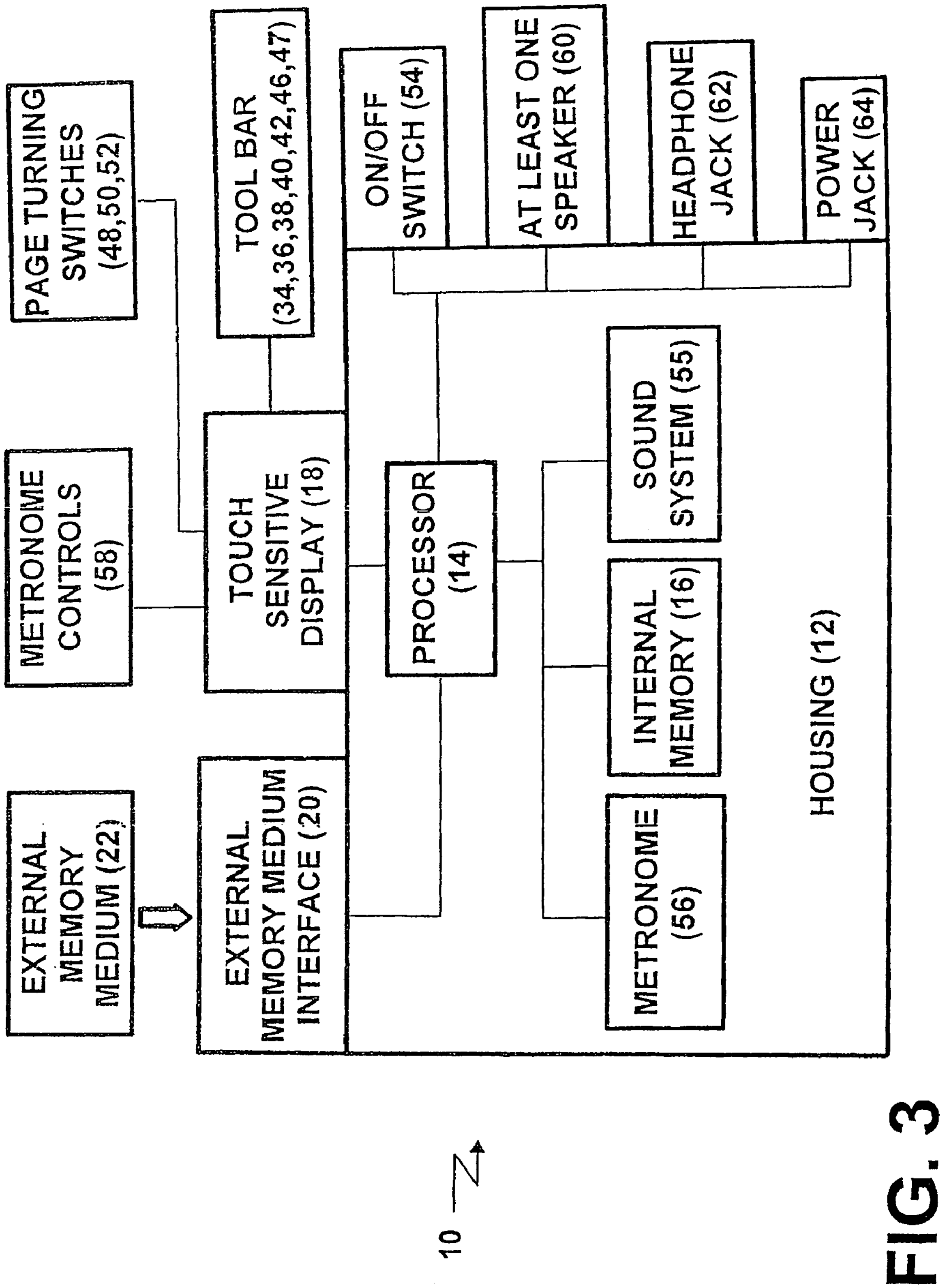
FIG. 3 is a block diagram of the interface of the components of the portable electronic music score device for transporting, storing, displaying, and annotating music scores of the present invention shown in FIG. 2.

The configuration of the portable electronic music score device 10 can best be seen in FIGS. 2 and 3, which are, respectively, an enlarged diagrammatic perspective view of the portable electronic sheet music device for transporting, storing, displaying, and annotating music scores of the present invention shown in FIG. 1, and a block diagram of the interface of the components of the portable electronic sheet music device for transporting, storing, displaying, and annotating music scores of the present invention shown in FIG. 2, and as such, will be discussed with reference thereto.

The portable electronic music score device 10 comprises a housing 12, a processor 14 that is contained in the housing 12, an internal memory 16 that is contained in the housing 12 and is operatively connected to the processor 14, a touch-sensitive display 18 that is disposed on the housing 12 and is operatively connected to the processor 14, and an external memory medium interface 20 that is accessible through the housing 12 and is operatively connected to the processor 14 and to an external memory medium 22. The external memory medium 22 is preferably an optical laser disk, such as CD or a DVD, but is not limited to that, and can include a memory stick, a flash EEPROM, and the like, etc., without departing in any way from the spirit of the present invention. The external memory medium interface 20 is preferably an optical laser disk drive 23, but is not limited to that, and can include a corresponding port on the housing 12 to receive the memory stick, the flash EEPROM, and the like, etc., respectively, without departing in any way from the spirit of the present invention.

The external memory medium 22 has encoded thereon music scores and corresponding titles that are displayed electronically as sheet music on the touch-sensitive display 18 following operative connection of the external memory medium 22 to the external memory medium interface 20 and selection of a title.

The touch-sensitive display 18 is preferably a touch-sensitive liquid-crystal display on which the processor 14 displays titles and scores encoded on the external memory medium 22. Titles are displayed in a form of a menu upon operative connection of the external memory medium 22 to the external memory medium interface 20, while a score is displayed on selection of a title from the menu.

The housing 12 has a left half 24 and a right half 26. The right half 26 of the housing 12 is hingedly attached to the left half 24 of the housing 12 so as to conceal and protect the touch-sensitive display 18 when the housing 12 is folded closed and not in use and so as to allow the device 10 to be portable.

The touch-sensitive display 18 has a left half 28 that is disposed on the left half 24 of the housing 12, has a lower left hand corner 27 and an upper left hand corner 29, and displays a left page of the music score. The touch-sensitive display 18 further has a right half 30 that is disposed on the right half 26 of the housing 12, has a lower right hand corner 31 and an upper right hand corner 33, and displays a right page of the music score. The right half 30 of the touch-sensitive display 18, together with the left half 28 of the touch-sensitive display 18, display two pages of the music score at a time, just as in a music book, once the score has been selected from the menu. The left half 28 of the touch-sensitive display 18 has a top 32, across which the corresponding title of the music score is displayed.

The device 10 further comprises a touch screen tool bar 34 that is located on the touch-sensitive display 18 and which is operatively connected to the processor 14. The touch screen tool bar 34 comprises, for example, a first touch screen sensor 36 that, for example, allows choosing size of notes depicted in the music scores displayed on the touch-sensitive display 18, and preferably allows a choice of 3 sizes. The touch screen tool bar 34 further comprises, for example, a second touch screen sensor 38 that, for example, allows adjusting contrast of the touch-sensitive display 18. The touch screen tool bar 34 further comprises, for example, a third touch screen sensor 40 that, for example, allows highlighting set categories, such as dynamics, on the touch-sensitive display 18. The touch screen tool bar 34 further comprises, for example, a fourth touch screen sensor 42 that, for example, allows writing in fingerings and comments on the touch-sensitive display 18 using a stylus 44 that is releasably attached to the left half 24 of the housing 12. The touch screen tool bar 34 further comprises, for example, a fifth touch screen sensor 46 that, for example, allows saving notations made on the touch-sensitive display 18 for future use. The touch screen tool bar 34 further comprises, for example, a sixth touch screen sensor 47 that is, for example, a single edit touch screen sensor that provides a dropdown menu that allows adjusting of color and brightness of the touch-sensitive display 18 and selecting of fonts for the notes and text that is depicted in the music scores displayed on the touch-sensitive display 18 and for the fingerings and comments written on the touch-sensitive display 18 using the stylus 44.

It is to be understood that the aforementioned touch screen sensors of the touch screen tool bar 34 are not limited in number and/or function to that which has been described and can include any number and/or function without departing in any way from the spirit of the present invention.

The device 10 further comprises page turning touch screen sensors 48 that are operatively connected to the processor 14. The page turning touch screen sensors 48 comprise a pair of first page turning touch screen sensors 50 that are disposed on the lower left hand corner 27 and the upper left hand corner 29 of the left half 28 of the touch-sensitive display 18, respectively, and when either one is activated, a previous two pages of the music score are displayed. The page turning touch screen sensors 48 further comprise a pair of second page turning touch screen sensors 52 that are disposed on the lower right hand corner 31 and the upper right hand corner 33 of the right half 30 of the touch-sensitive display 18, respectively, and when either one is activated, a next two pages of the music score are displayed.

The device 10 further comprises an on/off switch 54 that is disposed on the housing 12 and is operatively connected to the processor 14. The on/off switch 54 achieves a closed state when the housing 12 is unfolded open and achieves an open state when the housing 12 is folded closed.

The device 10 either powers down completely or enters one of at least two intermediate states in which the device 10 remembers its current state so as to form a saved state, but removes power from certain power-hungry components so as to form powered down components, when the on/off switch 54 achieves the open state thereof. The device 10 either restores the power to the powered down components while resuming operation using the saved state of the device 10 or restarts the device 10 from scratch, when the on/off switch 54 achieves the closed state thereof.

The device 10 further comprises a sound system 55, such as a sound card and the like, but is not limited to that. The sound system 55 is contained in the housing 12 and is operatively connected to the processor 14.

The device 10 further comprises a metronome 56 that is contained in the housing 12 and is operatively connected to the processor 14. The metronome 56 is useable either while the music score is displayed or not displayed on the touch-sensitive display 18.

The device 10 further comprises metronome touch screen sensor controls 58 that are disposed on the touch-sensitive display 18 and are operatively connected to the metronome 56.

The device 10 further comprises at least one speaker 60 that is audible through the housing 12 and is operatively connected to the processor 14. The at least one speaker 60 audiblizes the metronome 56 and any musical external memory medium 22 inserted into the external memory medium interface 20 so as to allow the device 10 to play music for a user to listen to.

The device 10 further comprises a headphone jack 62 that is on the housing 12 and is operatively connected to the processor 14. The headphone jack 62 is for receiving a headphone (not shown) for quiet listening of either the metronome 56 or the musical external memory medium 22 inserted into the external memory medium interface 20 instead of listening via the at least one speaker 60.

The device 10 further comprises a power jack 64 that is on the housing 12 and is operatively connected to the processor 14. The power jack 64 on the housing 12 is for receiving a power cord (not shown) for plugging into a conventional power source (not shown).

It will be understood that each of the elements described above, or two or more together, may also find a useful application in other types of constructions differing from the types described above.

While the invention has been illustrated and described as embodied in a portable electronic music score device for transporting, storing, displaying, and annotating music scores, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of the invention.

The invention claimed is:

1. A portable electronic sheet music device for transporting, storing, displaying, and annotating music scores, comprising:

a housing having an interior and an exterior;

a touch-sensitive display including a left screen and a right screen disposed to be visible from the exterior of the housing;

a processor contained in the housing and operatively connected to the display, the processor being configured to generate a toolbar on the display, the toolbar being configured to facilitate user instruction to the processor by means of touching the display at locations defined on the toolbar;

an internal memory contained in the housing and operatively connected to the processor; and an external memory medium interface accessible from the exterior and configured to bring an external memory medium into operative connection with the processor, the external memory medium being configured to store music scores such that the processor may cause the music scores to be displayed as a series of notes arrayed to resemble sheet music, the score being displayed as pages on the left screen and the right screen;

wherein the toolbar is further configured to allow an operator to instruct the processor to highlight at least one note by touching the at least one note at a note location on the display.

2. The device as defined in claim 1, wherein the toolbar is configured to include:

a reduce note location such that an operator may instruct the processor to reduce the size of displayed notes by touching the display at the reduce note location an enlarge note location such that an operator may instruct the processor to enlarge the size of displayed notes by touching the display at the enlarge note location.

3. The device as defined in claim 1, wherein the toolbar is configured to include at least one invoke toolbar location such that an operator may instruct the processor to display a second toolbar by touching the display at the invoke toolbar location.

4. The device as defined in claim 1, wherein:

the toolbar is configured to include:

an increase contrast location such that an operator may instruct the processor to increase the contrast of the display by touching the display at the increase contrast location; and a decrease contrast location such that an operator may instruct the processor to decrease the contrast of the display by touching the display at the decrease contrast location.

5. The device as defined in claim 1 wherein the toolbar is further configured to allow an operator to instruct the processor to display a fingering the operator to include in the score at the location of at least one note by touching the display at an at least one note location on the display.

6. The device as defined in claim 1, wherein the toolbar is further configured to allow an operator to instruct the processor to save a score as displayed by touching the display at a save score location.

7. The device as defined in claim 1, wherein said external memory medium is an optical laser disk.

8. The device as defined in claim 7, wherein said optical laser disk drive is accessible through said housing.

9. The device as defined in claim 1, wherein contact between a plurality of locations on the display arranged in a cursive pattern will instruct the processor to generate at least one notation according to the cursive pattern.

10. The device as defined in claim 1, wherein the processor is further configured to generate at least one of a turn forward location and a turn backward location, the turn forward location being configured such that an operator may instruct the processor to display a subsequent notes of the score by touching the display at the turn forward location and that an operator may instruct the processor to display earlier notes of the score relative to the current displayed notes of the score by touching the display at the turn backward location; and an internal memory contained in the housing and operatively connected to the processor.

11. The device as defined in claim 10, wherein the turn backward location is situated in the left screen; and wherein the turn forward location is situated in the right screen.

12. The device as defined in claim 1, further comprising an on/off switch;

wherein said on/off switch is operatively connected to said processor;

wherein said on/off switch is disposed on said housing;

wherein said on/off switch achieves a closed state when said housing is unfolded open; and wherein said on/off switch achieves an open state when said housing is folded closed.

13. The device as defined in claim 10, further comprising a metronome;

wherein said metronome is operatively connected to said processor;

wherein said metronome is contained in said housing; and wherein said metronome generates an aurally-cognizable signal at a regular interval.

14. The device as defined in claim 13, the processor generates a metronome tool bar to include at least one metronome location; and wherein contact with the at least one metronome location alters the temporal length of the interval.

15. The device as defined in claim 1, wherein said external memory medium includes one of a memory stick and a flash EEPROM.

16. The device as defined in claim 15, wherein said external memory medium interface is a port on said housing; and wherein said port on said housing is configured to receive said one of said memory stick and said flash EEPROM.

17. The device as defined in claim 13, further comprising a sound system;

wherein the sound system is contained within the housing; and wherein the sound system is operatively connected to the processor.

18. The device as defined in claim 17, wherein the sound system is a sound card.

19. The device as defined in claim 13, further comprising at least one speaker;

wherein the at least one speaker is audible through the housing;

wherein the at least one speaker is operatively connected to the processor;

wherein the at least one speaker audiblizes said metronome; and wherein the at least one speaker audiblizes any musical external memory medium inserted into the external memory medium interface so as to allow the device to play music for a user to listen to.

20. The device as defined in claim 19, further comprising a headphone jack;

wherein the headphone jack is on the housing;

wherein the headphone jack is operatively connected to the processor; and wherein the headphone jack is for receiving a headphone for quiet listening of one of the metronome and the musical external memory medium inserted into the external memory medium interface instead of listening via the at least one speaker.

21. The device as defined in claim 1, further comprising a power jack;

wherein the power jack is on the housing;

wherein the power jack is operatively connected to the processor; and wherein the power jack is for receiving a power cord for plugging into a conventional power source.

22. A portable electronic sheet music device for transporting, storing, displaying, and annotating music scores, comprising:

a housing having an interior and an exterior;

a touch-sensitive display including a left screen and a right screen disposed to be visible from the exterior of the housing;

a processor contained in the housing and operatively connected to the display, the processor being configured to generate a toolbar on the display, the toolbar being configured to facilitate user instruction to the processor by means of touching the display at locations defined on the toolbar;

an internal memory contained in the housing and operatively connected to the processor; and an external memory medium interface accessible from the exterior and configured to bring an external memory medium into operative connection with the processor, the external memory medium being configured to store music scores such that the processor may cause the music scores to be displayed as a series of notes arrayed to resemble sheet music, the score being displayed as pages on the left screen and the right screen;

wherein the toolbar is further configured to allow an operator to instinct the processor to display a fingering the operator to include in the score at the location of at least one note by touching the display at an at least one note location on the display.

23. A portable electronic sheet music device for transporting, storing, displaying, and annotating music scores, comprising:

a housing having an interior and an exterior;

a touch-sensitive display including a left screen and a right screen disposed to be visible from the exterior of the housing;

a processor contained in the housing and operatively connected to the display, the processor being configured to generate a toolbar on the display, the toolbar being configured to facilitate user instinction to the processor by means of touching the display at locations defined on the toolbar;

an internal memory contained in the housing and operatively connected to the processor; and an external memory medium interface accessible from the exterior and configured to bring an external memory medium into operative connection with the processor, the external memory medium being configured to store music scores such that the processor may cause the music scores to be displayed as a series of notes arrayed to resemble sheet music, the score being displayed as pages on the left screen and the right screen;

wherein contact between a plurality of locations on the display arranged in a cursive pattern will instruct the processor to generate at least one notation according to the cursive pattern.

* * * * *